United States Patent
Shih et al.

(10) Patent No.: US 11,983,195 B2
(45) Date of Patent: *May 14, 2024

(54) TOKENIZED VOICE AUTHENTICATED NARRATED VIDEO DESCRIPTIONS

(71) Applicant: Dapper Labs, Inc., Vancouver (CA)

(72) Inventors: Alexander Shih, Sugar Land, TX (US); Dietrich Theodore Shirley, Vancouver (CA); Roham Gharegozlou, Vancouver (CA)

(73) Assignee: Dapper Labs, Inc., Vancouver (CA)

( * ) Notice: Subject to any disclaimer, the term of this patent is extended or adjusted under 35 U.S.C. 154(b) by 0 days.

This patent is subject to a terminal disclaimer.

(21) Appl. No.: 17/978,191

(22) Filed: Oct. 31, 2022

(65) Prior Publication Data
US 2023/0177070 A1 Jun. 8, 2023

Related U.S. Application Data

(63) Continuation of application No. 17/545,571, filed on Dec. 8, 2021, now Pat. No. 11,520,806.

(51) Int. Cl.
*G06F 16/27* (2019.01)
*G06F 21/32* (2013.01)

(52) U.S. Cl.
CPC ............. *G06F 16/27* (2019.01); *G06F 21/32* (2013.01)

(58) Field of Classification Search
CPC ................................. G06F 16/27; G06F 21/32
See application file for complete search history.

(56) References Cited

U.S. PATENT DOCUMENTS

| | | | |
|---|---|---|---|
| 10,505,726 B1* | 12/2019 | Andon | G06Q 30/0185 |
| 11,173,404 B1* | 11/2021 | Koch | A63F 13/85 |
| 11,367,060 B1 | 6/2022 | Barbashin et al. | |
| 11,810,425 B1* | 11/2023 | Jones | G06Q 30/0208 |
| 2003/0225734 A1* | 12/2003 | Witt | G06F 16/51 707/E17.031 |
| 2013/0045751 A1* | 2/2013 | Chao | G01C 21/3602 455/456.1 |
| 2015/0092061 A1* | 4/2015 | Chao | G06Q 10/06 348/158 |
| 2015/0324886 A1 | 11/2015 | Hurst et al. | |
| 2019/0034838 A1* | 1/2019 | Canis | G06F 16/24578 |
| 2020/0005284 A1 | 1/2020 | Vijayan | |

(Continued)

OTHER PUBLICATIONS

U.S. Appl. No. 17/545,571, Non Final Office Action dated Apr. 12, 2022, 16 pgs.

(Continued)

*Primary Examiner* — Eliyah S. Harper
(74) *Attorney, Agent, or Firm* — Schwegman Lundberg & Woessner, P.A.

(57) ABSTRACT

Systems, methods, and computer readable media are disclosed for generating one or more improved NFTs are described. For example, a software application embedded with a mobile device may enable a user to search a public and/or private database of videos, select a video from the database, record a selfie-video, audio, or other narration of the video to create a narration file, and create and publish an NFT based on the narration file without leaving the application embedded with the mobile device (e.g., without navigating to a separate token creation platform).

20 Claims, 7 Drawing Sheets

(56) References Cited

U.S. PATENT DOCUMENTS

| | | | |
|---|---|---|---|
| 2020/0242105 A1* | 7/2020 | Rich | H04L 67/1097 |
| 2020/0273048 A1* | 8/2020 | Andon | G06Q 10/02 |
| 2021/0243027 A1 | 8/2021 | Gupta | |
| 2021/0248214 A1* | 8/2021 | Goldston | G06F 21/16 |
| 2021/0256070 A1* | 8/2021 | Tran | G06F 16/90332 |
| 2021/0326862 A1* | 10/2021 | Yantis | H04L 9/50 |
| 2021/0357447 A1* | 11/2021 | McKenzie | G11B 27/34 |
| 2022/0027447 A1 | 1/2022 | Keith, Jr. | |
| 2022/0027992 A1 | 1/2022 | Blevins | |
| 2022/0036905 A1 | 2/2022 | Keith, Jr. | |
| 2022/0069996 A1 | 3/2022 | Xue et al. | |
| 2022/0093256 A1 | 3/2022 | Keith, Jr. et al. | |
| 2022/0138705 A1 | 5/2022 | Wright | |
| 2022/0138791 A1 | 5/2022 | Dorward | |
| 2022/0138849 A1 | 5/2022 | Henson et al. | |
| 2022/0150220 A1 | 5/2022 | Verheyen | |
| 2022/0182700 A1 | 6/2022 | Utile | |
| 2022/0351195 A1* | 11/2022 | Quigley | G06Q 20/36 |
| 2022/0358450 A1* | 11/2022 | Stephens | G06F 16/27 |

OTHER PUBLICATIONS

U.S. Appl. No. 17/545,571, Notice of Allowance dated Aug. 5, 2022, 12 pgs.

U.S. Appl. No. 17/545,571, Response filed Jul. 6, 2022 to Non Final Office Action dated Apr. 12, 2022, 15 pgs.

"Flow Primer—Flow: Blockchain for Open Worlds", Flow, [Online] Retrieved from the internet: <URL: www.onflow.org/primer>, (2020), 15 pgs.

\* cited by examiner

TOKENIZED VOICE AUTHENTICATED NARRATED VIDEO DESCRIPTIONS

CLAIM OF PRIORITY

This application is a continuation of and claims the benefit of priority under 35 U.S.C. § 120 to U.S. patent application Ser. No. 17/545,571, filed on Dec. 8, 2021, which is incorporated by reference herein in its entirety.

TECHNICAL FIELD

The disclosed technology relates generally to non-fungible tokens (NFTs) based on narrated descriptions of video files with voice or other authentication to avoid fraud and the combination of the narration NFT with a corresponding video and/or other files.

BACKGROUND

An NFT is a unit of data stored on an electronically-maintained and computed distributed ledger (e.g., a blockchain), that represented ownership of one or more objects referenced by the NFT. The objects can be physical and/or digital objects. Typically, the NFT metadata references a specific instance of a physical or digital object for which the token represents ownership. As one example, NFTs can comprise a non-fungible token in accordance with an ERC-721 or ERC-1155 protocol, if deployed on the Ethereum blockchain. However, other types of NFT protocols and blockchains can be used (for example, using the Flow blockchain).

One popular type of NFT represents a digital collectible. Some NFTs are based on a video highlight of a sporting event or a live concert. However, the technology related to such digital collectibles is limited. For example, such digital collectibles are often a video file without audio.

In some cases, athletes, celebrities, or other well-known figures may create a digital audio file for various purposes, including for commercialization of the audio file via the internet or other networks. Unfortunately, due to technical limitations of many distribution platforms, an unscrupulous individual can pretend to be a well-known figure and fraudulently create and distribute the audio file. These and other technical limitations and drawbacks exist with known digital audio file distribution platforms.

Various public databases include videos of sports and other events. Often, the videos are subject to copyright and cannot be legally copied without permission from the copyright owner. This limits the ability to lawfully make NFTs based on these videos. Existing technologies (e.g., platforms for online databases of videos) are limited by not enabling someone to lawfully create a voice narration of a video and distribute the narration along with the video. Distribution of a narration without the video is less than ideal.

These and other technical limitations and drawbacks exist with known platforms for online databases of videos.

Brief Summary of Embodiments

Systems, methods, and computer readable media are disclosed for generating one or more improved NFTs. For example, a software application embedded with a mobile device may be configured to execute one or more functions. The first function can enable a user (e.g., a well-known person such as an athlete) to search a public and/or private database of videos. The second function can enable the user to select a video (e.g., a video of a sports or other highlight) from the database. The third function can enable the user to use the software application embedded with the mobile device (and a camera and/or microphone of the device on which the app resides) to record a selfie-video, audio, annotation and/or other multimedia narration of the video to create a narration file. As used herein "narration" can include video, audio, annotations and/or other forms of media or multimedia forms of commentary, enhancement or other supplementation of the video file. The fourth function can enable the user to create and publish an NFT based on the narration file without leaving the application embedded with the mobile device (e.g., without navigating to a separate token creation platform).

In some examples, the system and method may include an anti-fraud technology to prevent a user from falsely claiming to be another person (e.g., a well-known person such as an athlete). For example, the user may register with the system (e.g., prior to creating a narration file or prior to creating an NFT). As part of the registration, the software application may prompt the user to record and/or submit a voice sample. The voice sample may be stored in the system. The system may initiate a voice analysis process to compare the voice sample with another sample (e.g., to help confirm that the user is who they claim to be, etc.). For example, the voice sample may be compared to a stored file of the known user's voice. Other user verification techniques may be used in addition to and/or instead of the voice analysis process to verify the user's voice sample. In some examples, the NFT creation function of the software application may be disabled unless and until the registered user is verified by the system.

In some examples, the system may be configured to link the newly generated NFT (e.g., including the combined original video file with the narration file) with the original video file for which the narration was created. According to one embodiment, the NFT may include metadata that includes a Uniform Resource Identifier (URI) reference or other link to the video file.

In some examples, a second software application may be configured to access the created NFT with the narration. For example, the second software application may select or otherwise activate the newly generated NFT, read the metadata, and access the video file at the URI. The second software application may play the video file with the audio file concurrently in accordance with the metadata. In some examples, the software application may display the video at a display interface of a mobile device to display the video file while the narration file is being played. If the narration file includes a second video file (e.g., including audio and video of the narrator, in addition to the original NFT), the second software application may provide a first portion for displaying the video file and a second portion for displaying the video narration file (e.g., simultaneously with the video file) at the display interface of a mobile device.

In some examples, the system may be configured to combine the narration NFT, including the narration file, with the video file for which the narration was created. For example, in situations where the system operator obtains license rights to the video file (e.g., of the video highlight), the system can create a database of licensed videos. The licensed video file can be combined with a narration file and the combined files can be distributed together as an NFT or otherwise.

In some examples, the NFT can be based on a licensed video file and one or more narrations (including selfie-videos and/or audio narration files). The software application may be configured to display the video file and display a set of options for the user to select from among a set of narration files upon which the NFT is based. For example, an NFT may be based on a video file (e.g., a sports or other highlight) and one or more narrations of the highlight by one or more narrators (e.g., one or more players who appear in the video highlight or other narrators) who each create a narration of the highlight. When a user who possesses the NFT elects to watch the video file, the software application may present to the user via a display interface, identification of the set of narrations, and enable the user to select one of the narrations for play along with the video file. Other narration files can be subsequently selected.

The narrators may include one or more of the coaches of the player(s) who appear in the highlight, analysts, commentators, other celebrities, influencers, or other users. To the extent that the narrator purports to be a well-known person, the verification technology described above can be helpful to avoid fraudulent claims.

In some examples, one or more NFTs may be generated. A first NFT may be based on a video file. A second NFT may be based on a narration file. A third NFT may be based on a combination of the video file and the narration file (e.g., the first two NFTs).

The above stated aspects, as well as other aspects, features and advantages of the invention will become clear to those skilled in the art upon review of the following description. It should be understood that the description and specific examples, while describing several exemplary embodiments, are intended for purposes of illustration only and are not intended to limit the scope of the disclosure.

BRIEF DESCRIPTION OF THE DRAWINGS

The technology disclosed herein, in accordance with one or more various embodiments, is described in detail with reference to the following figures. The drawings are provided for purposes of illustration only and merely depict typical or example embodiments of the disclosed technology. These drawings are provided to facilitate the reader's understanding of the disclosed technology and shall not be considered limiting of the breadth, scope, or applicability thereof. It should be noted that for clarity and ease of illustration these drawings are not necessarily made to scale.

The figures are not intended to be exhaustive or to limit the invention to the precise form disclosed. It should be understood that the invention can be practiced with modification and alteration, and that the disclosed technology be limited only by the claims and the equivalents thereof.

DETAILED DESCRIPTION OF THE EMBODIMENTS

Figure 1:
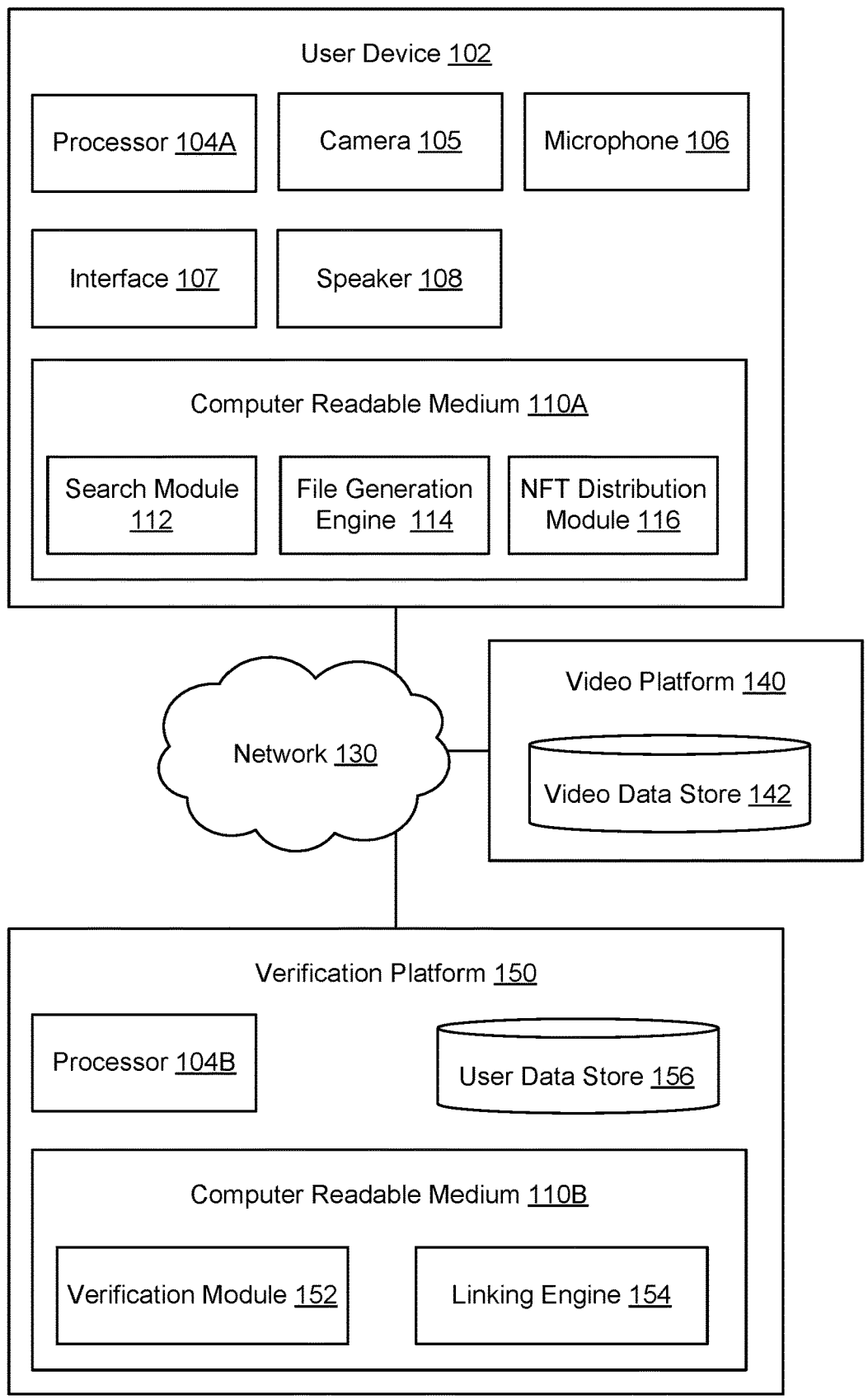
FIG. 1 is an illustrative user device, video platform, and verification platform, in accordance with the embodiments disclosed herein.

FIG. 1 is an illustrative user device, video platform, and verification platform, in accordance with the embodiments disclosed herein. For example, user device 102 may communicate via network 130 with one or more other computing devices/platforms, including video platform 140 and verification platform 150.

User device 102 may comprise processor 104 (illustrated as processor 104A), camera 105, microphone 106, interface 107, speaker 108, and computer readable medium 110 (illustrated as computer readable medium 110A). Computer readable medium 110A may comprise one or more modules and engines, including search module 112, file generation engine 114, and NFT distribution module 116.

Processor 104 (illustrated as processor 104A and 104B) may include one or more single core, dual core, quad core or other multi-core processors. Processor 104 may be implemented using any processor or logic device, such as a Complex Instruction Set Computer (CISC) microprocessor, a Reduced Instruction Set Computing (RISC) microprocessor, a Very Long Instruction Word (VLIW) microprocessor, a processor implementing a combination of instruction sets, or other processing device. Other modem circuits may be provided to perform other modem functions.

Camera 105 may be a component for recording visual images in the form of photographs, film, or digital video signals.

Microphone 106 may be a component for converting sound waves into electrical energy variations and storing as an audio file or narration file. The electrical energy variations may also be amplified or transmitted.

Interface 107 may be a component that receives human input (e.g., sight, touch, auditory, etc.) to interact with a computer, website, or application. Interface 107 may receive the input from input devices like keyboard, mouse, trackpad, microphone, touch screen, or camera, as well as output devices like monitors, speakers, and printers.

Speaker 108 may be a component that provides audio output. Speaker 108 may convert electromagnetic waves into sound waves. Speaker 108 may receive audio input from microphone 106, video platform 140, and/or verification platform 150, where the input may be either in analog or digital form. When analog speakers, the analog electromagnetic waves may be amplified into sound waves. When digital speakers, the digital input may be converted to an analog signal, and then the analog signal is used to generate the sound waves.

Computer readable medium 110 (illustrated as computer readable medium 110A and 110B) may be memory involved in carrying one or more sequences of one or more instructions to a processing device for execution.

Search module 112 is configured to enable a user (e.g., a well-known person such as an athlete) to search and select a video from video data store 142 or other public and/or private database of videos. For example, the user may operate user device 102 to browse to video platform 140 via network 130. The video platform 140 may provide a search tool. The user may access the search tool and provide one or more search queries to identify one or more relevant videos. The videos may be returned in search results. This video may be used to create an NFT (using file generation engine 114).

Search module 112 is also configured to access one or more created NFTs. For example, a first user may create an NFT with narration and upload it to video platform 140, which can be stored with video data store 142. The user may use the search tool to select or otherwise activate the newly generated NFT.

Search module 112 is also configured to provide search results with metadata. For example, search module 112 may receive one or more search results from video platform 140. The search results may comprise a video file, metadata associated with the video file, and/or uniform resource identifier (URI). Search module 112 is configured to read the metadata and access the video file at the URI. The metadata may include one or more computer-readable instructions to play the video file with the audio file. For example, the metadata may include instructions to concurrently play the video file with the narration (e.g., the audio file).

The search results may be displayed using interface 107 at user device 102. For example, the interface 107 at user device 102 may display the video file while the narration file is being played. If the narration file includes a second video file (e.g., including audio and video of the narrator, in addition to the original NFT), interface 107 may provide a first portion for displaying the video file and a second portion for displaying the video narration file (e.g., simultaneously with the video file).

In some examples, the NFT can be based on a video file and/or one or more narrations (e.g., one or more selfie-videos, audio narration files, etc.). Search module 112 may be configured to display the video file and a set of options for the user using interface 107 at user device 102. The set of options may be selectable by the user. The set of options may include one or more one or more selfie-videos, audio narration files, and other files upon which the NFT is based. For example, an NFT may be based on a video file (e.g., a sports or other highlight) and one or more narrations by one or more narrators (e.g., one or more players who appear in the video highlight or other narrators) who each create a narration file. When a user who possesses the NFT elects to watch the video file, search module 112 may present the files to the user via interface 107 at user device 102. The interface may present, for example, one or more identifications of the set of narrations and the corresponding video files. The interface may enable the user to select one of the narrations for play along with the video file. Other narration files can be subsequently selected. The NFT may include a narration file, which references a video file. Or the NFT may include a narration file and an associated video file.

File generation engine 114 is configured to receive an audio file (e.g., narration by a celebrity) corresponding with a video file. For example, an audio narration may be received by microphone 106 at user device 102. The narrator may include one or more users, including coaches of player(s) who appear in the video file, analysts, commentators, celebrities, influencers, or other users.

Figure 5:
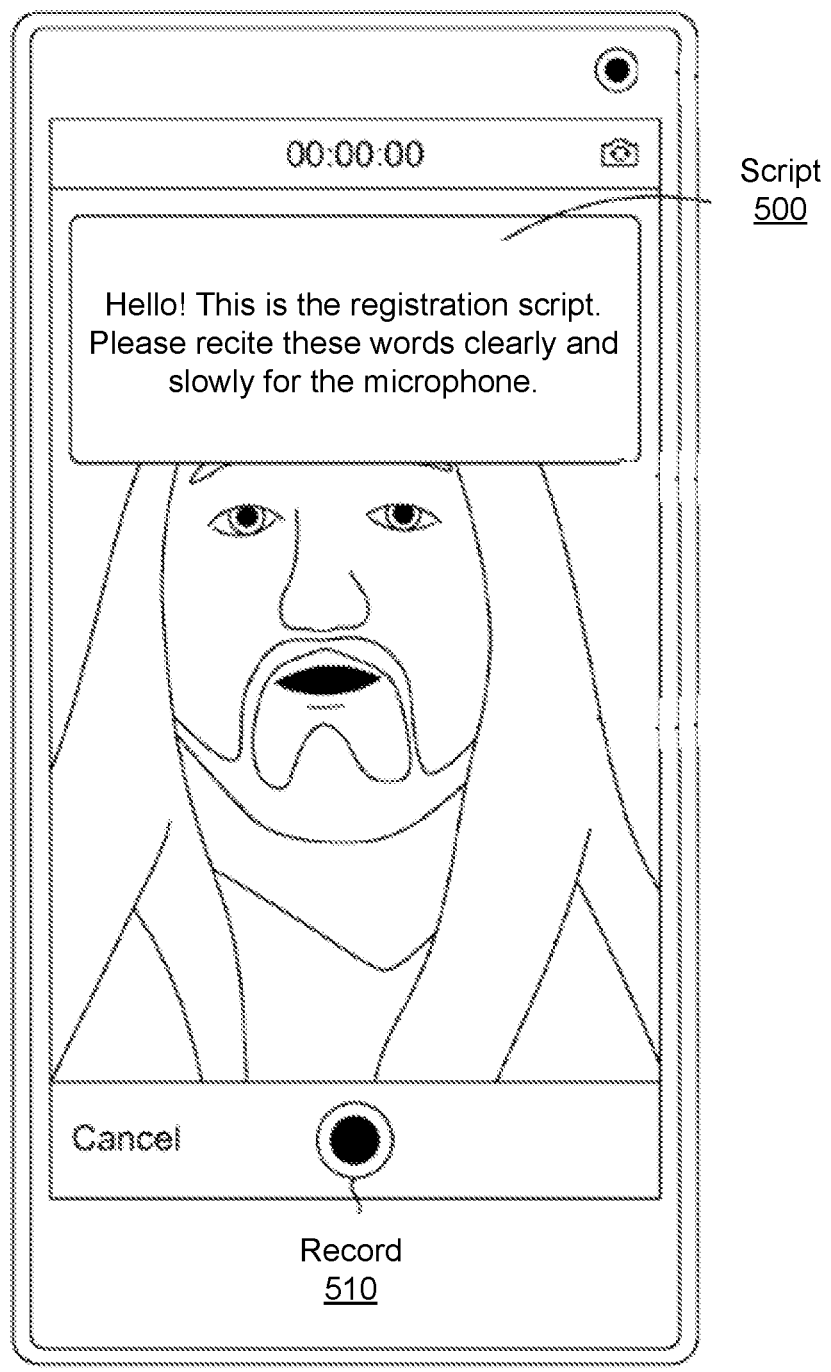
FIG. 5 is an illustrative interface for recording a narrative file or registering with the system, in accordance with the embodiments disclosed herein.

File generation engine 114 is also configured to record a voice sample (e.g., for registration and authentication). For example, the user may provide a voice sample that is captured at microphone 106. The voice sample may be recorded as an audio file. The audio file may be transmitted via network 130 and stored with user data store 156. In some examples, the voice sample may be generated by the user reciting a script that is presented at interface 107 of user device, as illustrated in FIG. 5.

File generation engine 114 is also configured to generate one or more NFTs. The NFTs can be based on a video file, narration file (e.g., audio file, etc.), or any combination of the video file and the narration file. In some examples, the creation of the NFT is based on the narration file without leaving the application embedded with the mobile device (e.g., without navigating to a separate token creation platform).

File generation engine 114 is also configured to capture images via camera 105 and audio via microphone 106. File generation engine 114 can record a selfie-video, narration or audio, or other audio corresponding with the video file to create the narration file.

NFT distribution module 116 is also configured to combine the narration file with the video file for which the narration was created in order to create the NFT. For example, in situations where the system operator obtains license rights to the video file (e.g., of the video highlight), NFT distribution module 116 can create a database of licensed videos in videos data store 142. The licensed video file can be combined with a narration file and the combined files can be distributed together as the NFT.

NFT distribution module 116 is configured to publish an NFT (e.g., video and narration). For example, the NFT may be generated locally (by file generation engine 114) and transmitted from user device 102 to video platform 140 via network 130. The NFT may be stored with the narration file at user device 102 prior to transmitting via network 130 (e.g., without navigating to a separate token creation platform).

Network 130 may provide a link or a connection through a local network to a host computer or to data equipment operated by an Internet Service Provider (ISP). The ISP in turn provides data communication services through the world wide packet data communication network now commonly referred to as the "Internet." Local network and Internet both use electrical, electromagnetic, or optical signals that carry digital data streams.

Video platform 140 may provide a search tool for identifying one or more videos stored by video data store 142. For example, user operating user device 102 may access the search tool using interface 107 at user device 102. The search tool may allow the user to search by, for example, a well-known person such as an athlete that is depicted in the video. Additional information about the search tool is provided with FIGS. 3-4.

Video platform 140 may comprise a video data store 142. Video data store 142 may comprise one or more videos that may be secured with a copyright or other legal license. Video data store 142 may correspond with a public or private database of videos. The videos may include, for example, a video of a sports or other highlight.

Verification platform 150 may comprise processor 104 (illustrated as processor 104B) and computer readable medium 110 (illustrated as computer readable medium 110B). Computer readable medium 110B may comprise one or more modules and engines, including verification module 152 and linking engine 154.

Verification module 152 may be configured to provide a registration process for one or more users that interact with the system. During the registration process, the user may provide a voice sample that is stored as an audio file with a user profile in user data store 156.

Verification module 152 may be configured to compare the audio file stored in user data store 156 with an incoming audio file. When the audio file programmatically matches the incoming audio file, verification module 152 may confirm that the audio file received during the registration process is the same person as the narrator user that generated the incoming audio file. To the extent that the narrator purports to be a well-known person, the verification technology can be helpful to avoid fraudulent claims that the narrator is the well-known person.

Verification module 152 may also be configured to prevent a user from falsely claiming to be another person (e.g., a well-known person such as an athlete). For example, the user may register with the system (e.g., prior to creating a narration file or prior to creating an NFT). As part of the registration, verification module 152 may prompt the user to record and/or submit a voice sample. The voice sample may be stored in user data store 156. Verification module 152 may initiate a voice analysis process to compare the voice sample with another sample (e.g., to help confirm that the user is who they claim to be, etc.). For example, the voice sample may be compared to a stored file of the known user's voice. Other user verification techniques may be used in addition to and/or instead of the voice analysis process to verify the user's voice sample. In some examples, the NFT creation function of the software application may be disabled unless and until the registered user is verified by the system.

Figure 2:
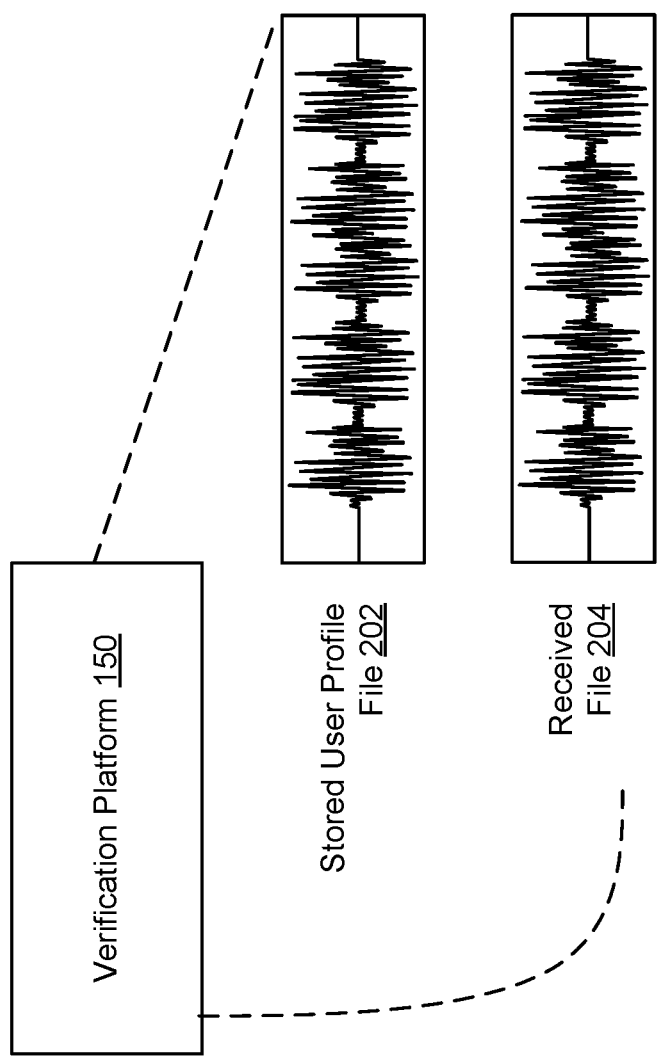
FIG. 2 is an illustrative audio verification process, in accordance with the embodiments disclosed herein.

An illustrative verification process is provided with FIG. 2. Verification platform 150 (using verification module 152) may receive the registered audio file 202 (from user data store 156) and a second audio file 204 (from a second user device via network 130). The second audio file 204 may correspond with a recited script, as provided during the registration process, or the narration file itself. In some examples, user data store 156 may also comprise frequency specifications or other data identifiers for data that may be represented as analog or digital signals.

Various technical techniques may be used for verification. For example, a Fourier transform may be applied in the frequency domain of the audio data. For example, a fast Fourier transform (FFT) may be implemented. During the analysis, each audio file (e.g., audio signal) may be compared with sinusoids of various frequencies to obtain a magnitude coefficient of each data source. If the coefficient is large in comparison to a coefficient threshold, there may be a high similarity between the signal and the sinusoid and the signal may contain a periodic oscillation at that frequency. When registered audio file 202 and the second audio file 204 are analyzed, this may determine that the data may be similar from the different sources. Alternatively, if the coefficient is small in comparison to the coefficient threshold, there may be little to no similarity between the signal and the sinusoid, which can identify that the periodic oscillation is present at a different frequency. When registered audio file 202 and the second audio file 204 are analyzed, this may determine that the data may not be similar.

Registered audio file 202 may also be compared with second audio file 204. The comparison may comprise various processes. For example, the comparison may comprise comparing registered audio file 202 and the second audio file 204. The process may also extract or identify portions of the audio, including a unique portion of the audio and a generic portion of the audio. In some examples, a multiplexing process may be implemented to combine multiple analog or digital signals into a single signal and transmitted via network 130. Verification module 152 may perform demultiplexing to extract or identify different audio portions, e.g., associated with different portions of the audio spectrum. Other verification techniques may be used.

Returning to FIG. 1, verification platform 150 may also comprise linking engine 154. Linking engine 154 may be configured to link a newly generated NFT (e.g., including the combined original video file with the narration file) with the original video file for which the narration was created. The link may be stored in video data store 142 or in metadata associated with the NFT. In some examples, the NFT may include metadata that includes a Uniform Resource Identifier (URI) reference or other link to the video file.

Figure 3:
FIG. 3 is an illustrative interface for initiating a search for a video file, in accordance with the embodiments disclosed herein.

FIG. 3 is an illustrative interface for initiating a search for a video file, in accordance with the embodiments disclosed herein. For example, user device 102 may access video platform 140, which may provide a search tool. The user may access the search tool and provide one or more search queries to identify one or more relevant videos. The user may provide search queries comprising, for example, a video category, one or more people featured in the video, a rating, a price, or other characteristics associated with the video file.

Figure 4:
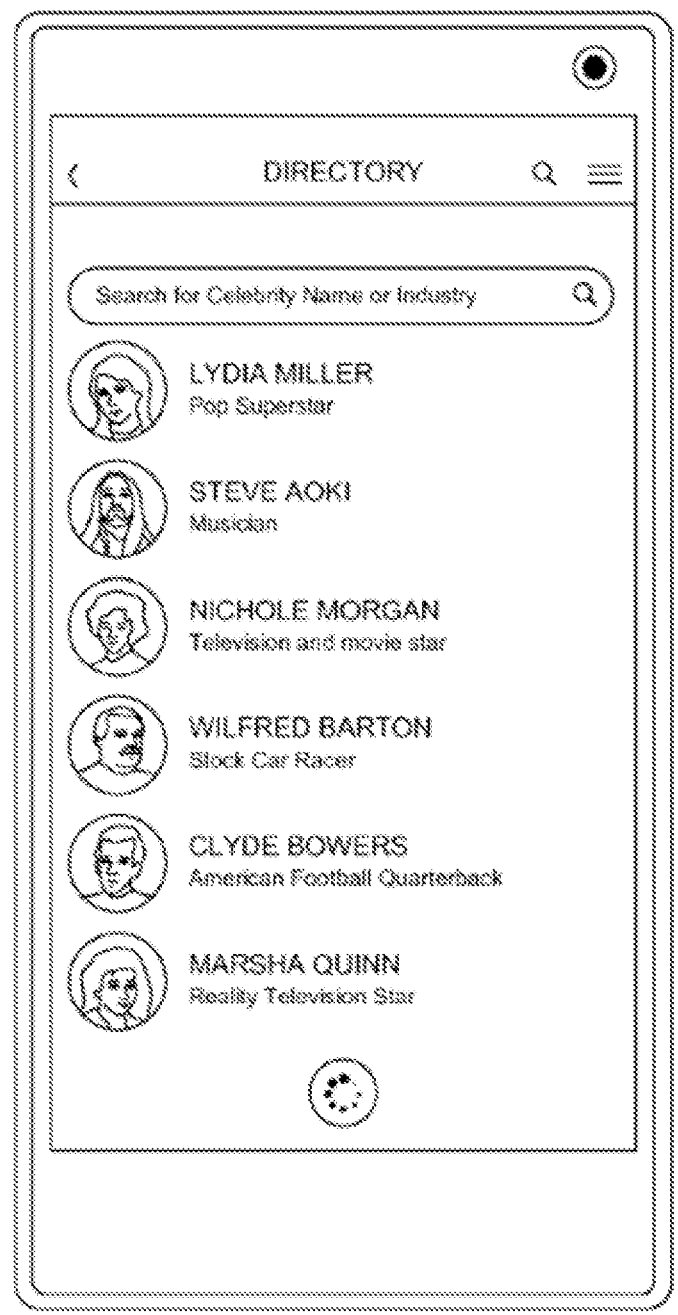
FIG. 4 is an illustrative interface for initiating a search for a video file, in accordance with the embodiments disclosed herein.

FIG. 4 is an illustrative interface for initiating a search for a video file, in accordance with the embodiments disclosed herein. For example, user device 102 may access video platform 140, which may provide a search tool. The user may access the search tool and provide one or more search queries to identify one or more relevant videos. The search tool may provide a list of videos with one or more characteristics associated with the video file. The user may interact with interface 107 to select one or more video files from the list of videos.

FIG. 5 is an illustrative interface for recording a narrative file or registering with the system, in accordance with the embodiments disclosed herein. For example, user device 102 may access verification platform 150 via network 130. Interface 107 may provide a script 500 corresponding with the verification process. The user may select the record tool 510 to start a recording and repeat the words from the script 500. The user may select the record tool 510 to stop the recording. Between the time frame of starting and stopping the recording, an audio file may be created that stores the voice sample generated while the user was reciting the script 500.

A similar process may be performed while generating a narration file. For example, the user may select the record tool 510 to start a recording and select the record tool 510 again to stop the recording. Between the time frame of starting and stopping the recording, a narration file may be created that stores the voice sample generated. Rather than reciting the script, the narration file may correspond with a video file such that the user may be describing aspects of the video, highlights, or other features that the user can provide additional information that may not be included in the original video file. In some examples, the video file may be playing at interface 107 during the time frame of starting and stopping the recording.

Figure 6:
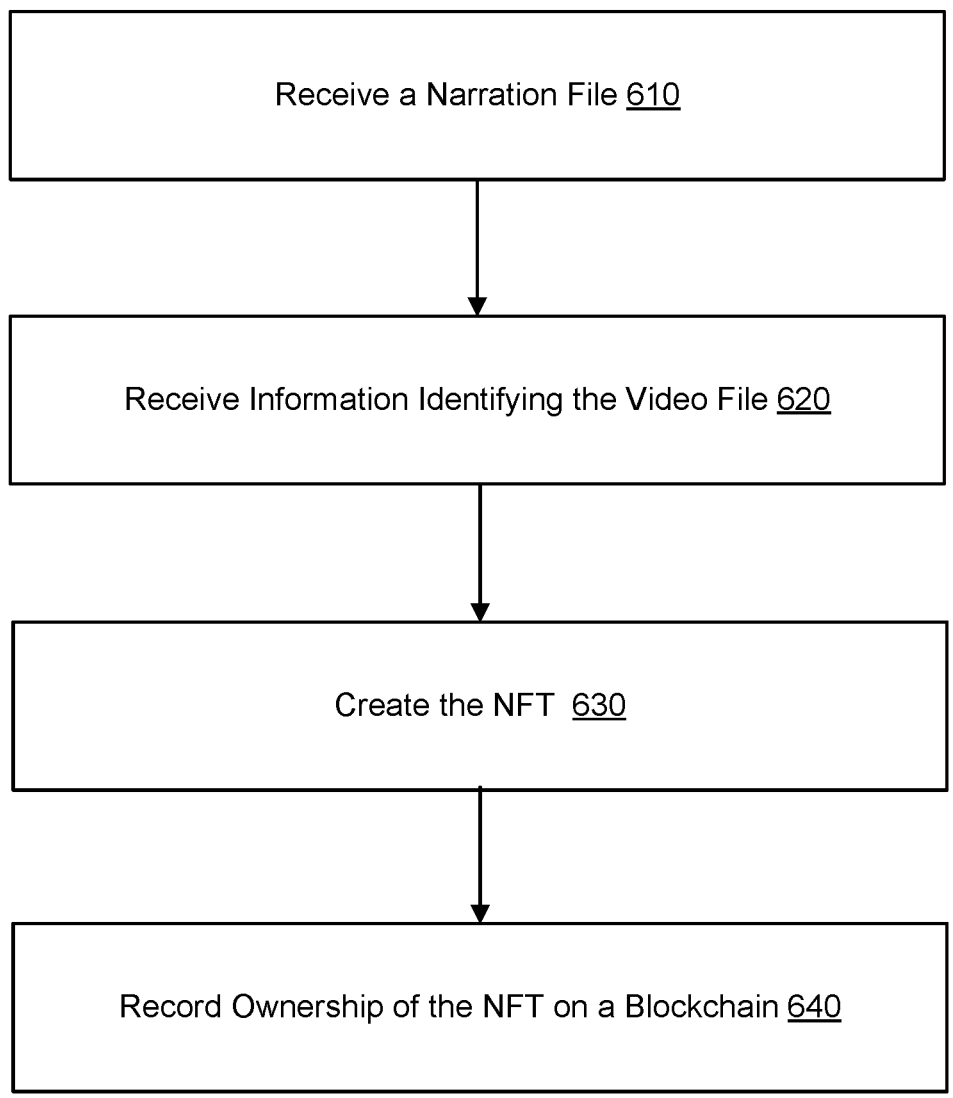
FIG. 6 provides an illustrative process, in accordance with the embodiments disclosed herein.

FIG. 6 provides an illustrative process, in accordance with the embodiments disclosed herein. The illustrative process may be executed by verification platform 150.

At 610, the computer system may receive a narration file.

At 620, the computer system may receive information identifying the video file.

At 630, the computer system may create the NFT. The NFT may include metadata comprising a data structure including a reference to the narration file and a reference to the video.

Figure 7:
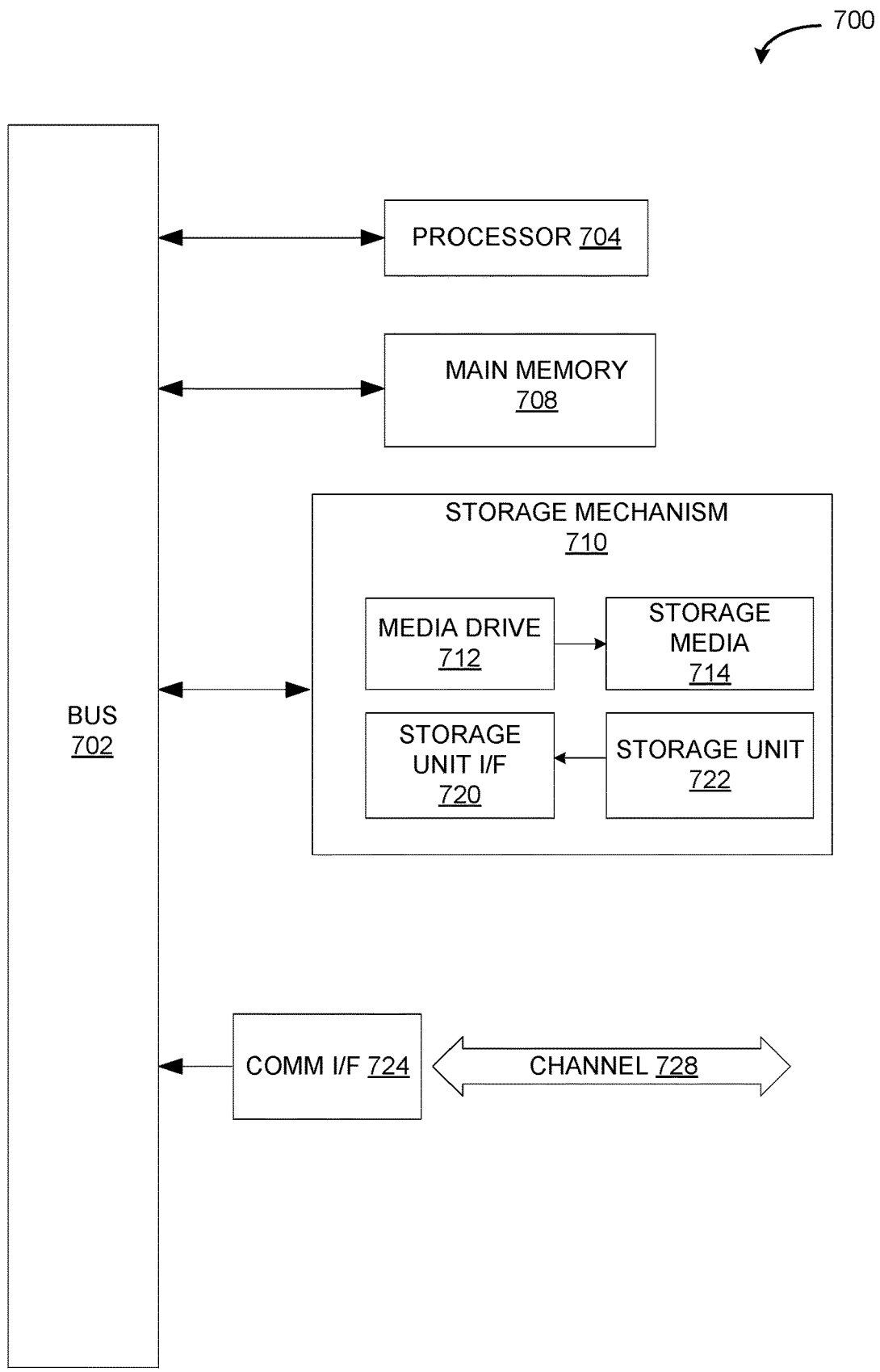
FIG. 7 is an example of a computing system that may be used in implementing various features of embodiments of the disclosed technology.

At 640, the computer system may record ownership of the NFT on a blockchain.

Where components, logical circuits, or engines of the technology are implemented in whole or in part using software, in one embodiment, these software elements can be implemented to operate with a computing or logical circuit capable of carrying out the functionality described with respect thereto. One such example logical circuit is shown in FIG. 7. Various embodiments are described in terms of this example logical circuit 700. After reading this description, it will become apparent to a person skilled in the relevant art how to implement the technology using other logical circuits or architectures.

Referring now to FIG. 7, computing system 700 may represent, for example, computing or processing capabilities found within desktop, laptop, and notebook computers; hand-held computing devices (PDA's, smart phones, cell phones, palmtops, etc.); mainframes, supercomputers, workstations, or servers; or any other type of special-purpose or general-purpose computing devices as may be desirable or appropriate for a given application or environment. Logical circuit 700 might also represent computing capabilities embedded within or otherwise available to a given device. For example, a logical circuit might be found in other electronic devices such as, for example, digital cameras, navigation systems, cellular telephones, portable computing devices, modems, routers, WAPs, terminals and other electronic devices that might include some form of processing capability.

Computing system 700 might include, for example, one or more processors, controllers, control engines, or other processing devices, such as a processor 704. Processor 704 might be implemented using a general-purpose or special-purpose processing engine such as, for example, a microprocessor, controller, or other control logic. In the illustrated example, processor 704 is connected to a bus 702, although any communication medium can be used to facilitate interaction with other components of logical circuit 700 or to communicate externally.

Computing system 700 might also include one or more memory engines, simply referred to herein as main memory 708. For example, preferably random-access memory (RAM) or other dynamic memory, might be used for storing information and instructions to be executed by processor 704. Main memory 708 might also be used for storing temporary variables or other intermediate information during execution of instructions to be executed by processor 704. Logical circuit 700 might likewise include a read only memory ("ROM") or other static storage device coupled to bus 702 for storing static information and instructions for processor 704.

The computing system 700 might also include one or more various forms of information storage mechanism 710, which might include, for example, a media drive 712 and a storage unit interface 720. The media drive 712 might include a drive or other mechanism to support fixed or removable storage media 714. For example, a hard disk drive, a floppy disk drive, a magnetic tape drive, an optical disk drive, a CD or DVD drive (R or RW), or other removable or fixed media drive might be provided. Accordingly, storage media 714 might include, for example, a hard disk, a floppy disk, magnetic tape, cartridge, optical disk, a CD or DVD, or other fixed or removable medium that is read by, written to, or accessed by media drive 712. As these examples illustrate, the storage media 714 can include a computer usable storage medium having stored therein computer software or data.

In alternative embodiments, information storage mechanism 740 might include other similar instrumentalities for allowing computer programs or other instructions or data to be loaded into logical circuit 700. Such instrumentalities might include, for example, a fixed or removable storage unit 722 and an interface 720. Examples of such storage units 722 and interfaces 720 can include a program cartridge and cartridge interface, a removable memory (for example, a flash memory or other removable memory engine) and memory slot, a PCMCIA slot and card, and other fixed or removable storage units 722 and interfaces 720 that allow software and data to be transferred from the storage unit 722 to logical circuit 700.

Logical circuit 700 might also include a communications interface 724. Communications interface 724 might be used to allow software and data to be transferred between logical circuit 700 and external devices. Examples of communications interface 724 might include a modem or soft modem, a network interface (such as an Ethernet, network interface card, WiMedia, IEEE 802.XX or other interface), a communications port (such as for example, a USB port, IR port, RS232 port Bluetooth® interface, or other port), or other communications interface. Software and data transferred via communications interface 724 might typically be carried on signals, which can be electronic, electromagnetic (which includes optical) or other signals capable of being exchanged by a given communications interface 724. These signals might be provided to communications interface 724 via a channel 728. This channel 728 might carry signals and might be implemented using a wired or wireless communication medium. Some examples of a channel might include a phone line, a cellular link, an RF link, an optical link, a network interface, a local or wide area network, and other wired or wireless communications channels.

In this document, the terms "computer program medium" and "computer usable medium" are used to generally refer to media such as, for example, memory 708, storage unit 720, media 714, and channel 728. These and other various forms of computer program media or computer usable media may be involved in carrying one or more sequences of one or more instructions to a processing device for execution. Such instructions embodied on the medium, are generally referred to as "computer program code" or a "computer program product" (which may be grouped in the form of computer programs or other groupings). When executed, such instructions might enable the logical circuit 700 to perform features or functions of the disclosed technology as discussed herein.

Although FIG. 7 depicts a computer network, it is understood that the disclosure is not limited to operation with a computer network, but rather, the disclosure may be practiced in any suitable electronic device. Accordingly, the computer network depicted in FIG. 7 is for illustrative purposes only and thus is not meant to limit the disclosure in any respect.

While various embodiments of the disclosed technology have been described above, it should be understood that they have been presented by way of example only, and not of limitation. Likewise, the various diagrams may depict an example architectural or other configuration for the disclosed technology, which is done to aid in understanding the features and functionality that can be included in the disclosed technology. The disclosed technology is not restricted to the illustrated example architectures or configurations, but the desired features can be implemented using a variety of alternative architectures and configurations. Indeed, it will be apparent to one of skill in the art how alternative functional, logical, or physical partitioning and configurations can be implemented to implement the desired features of the technology disclosed herein. Also, a multitude of different constituent engine names other than those depicted herein can be applied to the various partitions.

Additionally, with regard to flow diagrams, operational descriptions and method claims, the order in which the steps are presented herein shall not mandate that various embodiments be implemented to perform the recited functionality in the same order unless the context dictates otherwise.

Although the disclosed technology is described above in terms of various exemplary embodiments and implementations, it should be understood that the various features, aspects and functionality described in one or more of the individual embodiments are not limited in their applicability to the particular embodiment with which they are described, but instead can be applied, alone or in various combinations, to one or more of the other embodiments of the disclosed technology, whether or not such embodiments are described and whether or not such features are presented as being a part of a described embodiment. Thus, the breadth and scope of the technology disclosed herein should not be limited by any of the above-described exemplary embodiments.

Terms and phrases used in this document, and variations thereof, unless otherwise expressly stated, should be construed as open ended as opposed to limiting. As examples of the foregoing: the term "including" should be read as meaning "including, without limitation" or the like; the term "example" is used to provide exemplary instances of the item in discussion, not an exhaustive or limiting list thereof; the terms "a" or "an" should be read as meaning "at least one," "one or more" or the like; and adjectives such as "conventional," "traditional," "normal," "standard," "known" and terms of similar meaning should not be construed as limiting the item described to a given time period or to an item available as of a given time, but instead should be read to encompass conventional, traditional, normal, or standard technologies that may be available or known now or at any time in the future. Likewise, where this document refers to technologies that would be apparent or known to one of ordinary skill in the art, such technologies encompass those apparent or known to the skilled artisan now or at any time in the future.

The presence of broadening words and phrases such as "one or more," "at least," "but not limited to" or other like phrases in some instances shall not be read to mean that the narrower case is intended or required in instances where such broadening phrases may be absent. The use of the term "engine" does not imply that the components or functionality described or claimed as part of the engine are all configured in a common package. Indeed, any or all of the various components of an engine, whether control logic or other components, can be combined in a single package or separately maintained and can further be distributed in multiple groupings or packages or across multiple locations.

Additionally, the various embodiments set forth herein are described in terms of exemplary block diagrams, flow charts and other illustrations. As will become apparent to one of ordinary skill in the art after reading this document, the illustrated embodiments and their various alternatives can be implemented without confinement to the illustrated examples. For example, block diagrams and their accompanying description should not be construed as mandating a particular architecture or configuration.

What is claimed is:

1. A method comprising:
   accessing, by one or more processors, metadata of a non-fungible token (NFT) referencing a narration file that includes a narration of an event depicted by a video file, the metadata of the NFT indicating the narration file, the video file, and a start time within the video file;
   accessing, by the one or more processors, the narration file referenced by the NFT and indicated by the metadata;
   accessing, by the one or more processors, the video file indicated by the metadata; and
   causing, by the one or more processors, a media player to play the narration file concurrently with playing the video file based on the start time indicated by the metadata.

2. The method of claim 1, further comprising:
   generating the NFT that references the narration file, the generated NFT including the metadata that indicates the narration file, the video file, and the start time within the video file.

3. The method of claim 1, wherein:
   the NFT that references the narration file is a first NFT; and
   the method further comprises:
   linking the first NFT that references the narration file to a second NFT that references the video file indicated by the metadata of the first NFT.

4. The method of claim 1, wherein:
   the NFT that references the narration file is a first NFT; and
   the method further comprises:
   accessing a second NFT that references the video file indicated by the metadata of the first NFT that references the narration file; and
   generating a third NFT based on the narration file and the video file.

5. The method of claim 1, wherein:
   the video file depicts a person that created the narration file; and
   the metadata of the NFT identifies the person that created the narration file and is depicted in the video file.

6. The method of claim 1, wherein:
   the video file depicts a sports play from the event; and
   the metadata of the NFT includes a description of the sports play depicted by the video file.

7. A non-transitory machine-readable storage medium comprising instructions that, when executed by one or more processors of a machine, cause the machine to perform operations comprising:
   accessing metadata of a non-fungible token (NFT) referencing a narration file that includes a narration of an event depicted by a video file, the metadata of the NFT indicating the narration file, the video file, and a start time within the video file;
   accessing the narration file referenced by the NFT and indicated by the metadata;
   accessing the video file indicated by the metadata; and
   causing a media player to play the narration file concurrently with playing the video file based on the start time indicated by the metadata.

8. The non-transitory machine-readable storage medium of claim 7, wherein the operations further comprise:
   generating the NFT that references the narration file, the generated NFT including the metadata that indicates the narration file, the video file, and the start time within the video file.

9. The non-transitory machine-readable storage medium of claim 7, wherein:
   the NFT that references the narration file is a first NFT; and
   the operations further comprise:
   linking the first NFT that references the narration file to a second NFT that references the video file indicated by the metadata of the first NFT.

10. The non-transitory machine-readable storage medium of claim 7, wherein:

the NFT that references the narration file is a first NFT; and the operations further comprise:

accessing a second NFT that references the video file indicated by the metadata of the first NFT that represents the narration file; and generating a third NFT based on the narration file and the video file.

11. A system comprising:

one or more processors; and a memory storing instructions that, when executed by at least one processor among the one or more processors, cause the system to perform operations comprising:

accessing metadata of a non-fungible token (NFT) referencing a narration file that includes a narration of an event depicted by a video file, the metadata of the NFT indicating the narration file, the video file, and a start time within the video file;

accessing the narration file referenced by the NFT and indicated by the metadata;

accessing the video file indicated by the metadata; and causing a media player to play the narration file concurrently with playing the video file based on the start time indicated by the metadata.

12. The system of claim 11, wherein the operations further comprise:

generating the NFT that references the narration file, the generated NFT including the metadata that indicates the narration file, the video file, and the start time within the video file.

13. The system of claim 11, wherein:

the NFT that references the narration file is a first NFT; and the operations further comprise:

linking the first NFT that references the narration file to a second NFT that represents the video file indicated by the metadata of the first NFT.

14. The system of claim 11, wherein:

the NFT that references the narration file is a first NFT; and the operations further comprise:

accessing a second NFT that references the video file indicated by the metadata of the first NFT that references the narration file; and generating a third NFT based on the narration file and the video file.

15. A method comprising:

accessing, by one or more processors, a narration file that includes a narration of an event depicted by a video file;

generating, by the one or more processors, metadata of a non-fungible token (NFT) to reference the narration file, the generated metadata indicating the narration file, the video file, and a start time within the video file; and generating, by the one or more processors, the NFT that references the narration file, the generated NFT including the generated metadata that indicates the narration file, the video file, and the start time within the video file.

16. The method of claim 15, wherein:

the video file depicts a person that created the narration file; and the generated metadata of the NFT identifies the person that created the narration file and is depicted in the video file.

17. The method of claim 15, wherein:

the video file depicts a sports play from the event; and the generated metadata of the NFT includes a description of the sports play depicted by the video file.

18. A non-transitory machine-readable storage medium comprising instructions that, when executed by one or more processors of a machine, cause the machine to perform operations comprising:

accessing a narration file that includes a narration of an event depicted by a video file;

generating metadata of a non-fungible token (NFT) to reference the narration file, the generated metadata indicating the narration file, the video file, and a start time within the video file; and generating the NFT that references the narration file, the generated NFT including the generated metadata that indicates the narration file, the video file, and the start time within the video file.

19. A system comprising:

one or more processors; and a memory storing instructions that, when executed by at least one processor among the one or more processors, cause the system to perform operations comprising:

accessing a narration file that includes a narration of an event depicted by a video file;

generating metadata of a non-fungible token (NFT) to reference the narration file, the generated metadata indicating the narration file, the video file, and a start time within the video file; and generating the NFT that references the narration file, the generated NFT including the generated metadata that indicates the narration file, the video file, and the start time within the video file.

20. The system of claim 19, wherein:

the video file depicts a person that created the narration file; and the generated metadata of the NFT identifies the person that created the narration file and is depicted in the video file.

* * * * *

UNITED STATES PATENT AND TRADEMARK OFFICE
CERTIFICATE OF CORRECTION

| | | |
|---|---|---|
| PATENT NO. | : 11,983,195 B2 | Page 1 of 1 |
| APPLICATION NO. | : 17/978191 | |
| DATED | : May 14, 2024 | |
| INVENTOR(S) | : Shih et al. | |

It is certified that error appears in the above-identified patent and that said Letters Patent is hereby corrected as shown below:

In the Specification

In Column 9, Line 62, delete "740" and insert --710-- therefor

Signed and Sealed this
Twenty-eighth Day of January, 2025

Coke Morgan Stewart
*Acting Director of the United States Patent and Trademark Office*